| United States Patent [19] | [11] 4,038,041 |
|---|---|
| Duvall et al. | [45] July 26, 1977 |

[54] COMPOSITE INTERLAYER FOR DIFFUSION BONDING

[75] Inventors: David Scott Duvall, Cobalt; Daniel Francis Paulonis, Moodus, both of Conn.

[73] Assignee: United Technologies Corporation, Hartford, Conn.

[21] Appl. No.: 642,627

[22] Filed: Dec. 19, 1975

[51] Int. Cl.² ............................................. B32B 15/00
[52] U.S. Cl. ..................................... 428/576; 204/23; 228/117; 228/194; 427/248 R
[58] Field of Search ................ 29/194, 198, 180, 191; 228/194

[56] References Cited

U.S. PATENT DOCUMENTS

| 3,675,311 | 7/1972 | Wells ..................................... 228/194 |
| 3,678,570 | 7/1972 | Paulonis et al. ..................... 228/194 |
| 3,753,794 | 8/1973 | Paulonis et al. ................... 29/194 X |

Primary Examiner—L. Dewayne Rutledge
Assistant Examiner—E. L. Weise
Attorney, Agent, or Firm—Charles E. Sohl

[57] ABSTRACT

An interlayer for transient liquid phase diffusion bonding of the nickel, cobalt and iron alloys is provided between surfaces to be joined as a thin lamellar composite.

6 Claims, No Drawings

COMPOSITE INTERLAYER FOR DIFFUSION BONDING

BACKGROUND OF THE INVENTION

The present invention relates in general to the art of diffusion bonding and, more particularly, to diffusion bonding of the superalloys utilizing a transient liquid phase in the bonding process.

Transient liquid phase diffusion bonding has been shown to be a very useful method for producing high quality diffusion bonds in the high temperature superalloys, such as those utilized in the manufacture of gas turbine engine hardware. Such bonding is described in detail in the U.S. Pat. No. 3,678,570 to D. F. Paulonis et al, of common assignee herewith, and whose teachings are incorporated herein by reference.

The superalloys are recognized as those alloys, usually having their basis in nickel, cobalt or iron, or some combination thereof exhibiting good high temperature strength and oxidation resistance in environments such as gas turbine engines. Usually, these alloys also contain substantial quantities of chromium and other elements such as aluminum, titanium and the refractory metals.

It is frequently desirable to make certain gas turbine engine components by joining easily fabricable segments together into the desired configurations. However, the limited weldability of many of these superalloys has severely limited the applicability of conventional joining techniques, such as fusion welding, in the production of structural hardware. Further, many components because of their design are simply not adapted to the utilization of fusion welding. Brazing, while offering a number of advantages over fusion welding, has very limited application because of the penalties associated with the relatively low strengths and low melting points of typical brazed joints.

The relative simplicity and reproducibility of the transient liquid phase diffusion bonding technique in the production of high quality bonds in sensitive hardware has led to substantial usage thereof. This is particularly true in the gas turbine engine industry although the invention described herein is obviously not limited thereto.

One key element in the transient liquid phase diffusion bonding technique is the provision between the surfaces to be joined of a thin alloy interlayer. This interlayer melts at a temperature below the melting temperature of the materials being joined, and through diffusion, solidifies at the joining temperature to form a bond. The composition of the interlayer preferably should be tailored to the alloys being joined, particularly with respect to the inclusion therein of those elements whose presence is required in the finished bond area and whose solid state diffusion rates are slow. It is also desirable to exclude from the interlayer alloy those elements which may adversely affect the bonding process or the quality of the finished joint. A melting point depressant (usually boron) is added to reduce the melting point of the interlayer to the desired point.

Since the amount of melting point depressant (boron) added to an interlayer to allow it to sufficiently melt at the bonding temperature also renders it extremely brittle; and therefore, unrollable in homogeneous form, other methods of applying such interlayers have been devised.

One method of getting the interlayer alloy species between the faying surfaces is through the use of a thin ductile foil of the type described in the U.S. Pat. No. 3,753,794 to D. F. Paulonis et al, which also shares a common assignee herewith. Ductile interlayer foil as described in this patent is manufactured by rolling the interlayer composition (minus the boron) into foil of the desired thickness and subsequently adding boron to the surfaces of the foil through a boronizing process. Another method is by providing an interlayer composition as a plate or coating (containing boron) on one or more of the faying surfaces themselves, as described in application Ser. No. 642,626 filed concurrently herewith. As previously mentioned it is generally important that at the completion of the diffusion bonding operation that the composition across the bond area include those elements whose presence is advantageous for optimum strength. In the case of some of the elements whose solid state diffusion rates are slow, it is desirable to provide these elements between the surfaces to be joined so that sole reliance on diffusion from the parent metal is not necessary. This is particularly true in the case of bonding gaps of substantial width because of the extended bonding cycle which would be required to provide diffusion over the greater distance.

In some cases, it is not feasible to provide all of the desired components in a single homogeneous interlayer foil (prior to boronizing) for several reasons. Principally, such complex alloys would either be physically impossible to roll into the thin foil required or would not melt sufficiently at the bonding temperature.

SUMMARY OF THE INVENTION

According to the present invention an interlayer alloy is provided as a thin lamellar composite which will be positioned between the surfaces to be joined. This composite comprises a single foil of one distinct composition in combination with one or more other foils also of distinct composition and/or one or more directly deposited metallic layers on any of the foils or the surfaces to be bonded. The amounts and distinct compositions of the individual lamellar are such that the overall composition of the composite is equivalent to the desired interlayer composition.

DESCRIPTION OF THE PREFERRED EMBODIMENT

In the following description, all compositions are given in weight percent unless otherwise specified.

The transient liquid phase bonding techniques utilizes an interlayer between the articles being joined which contains a melting point depressant in an alloy which ideally is similar to the alloys being joined. Certain elements present in the alloy being joined are excluded from the interlayer to prevent the formation of brittle, difficult-to-eliminate phases in the bond. Also, a melting point depressant which has a high diffusion coefficient in the alloy which comprises the articles being joined is required so that after the joint is heated above the interlayer melting point, solidification will occur isothermally as the concentration of the melting point depressant in the interlayer is reduced by diffusion into the articles being joined.

In order to insure proper bonding, and to minimize the total amount of melting point depressant in the finished bond, thin uniform interlayers are required and these are most advantageously produced by rolling to foil form. The current commercial practice is to prepare the interlayer without the melting point depressant, and to subsequently add the melting point depressant (usually boron) to the surfaces of the foil by a diffusion process (boronizing). It is preferred that the interlayer composition be as similar as possible to the alloys being joined (excluding the melting point depressant) so that the finished bond will be as similar as possible to the parent metal. Unfortunately, in some cases difficulties are encountered in the preparation of interlayers for joining the high strength superalloys because certain combinations of alloy constituents react and severely impair the interlayer material ductility and fabricability.

A majority of nickel base superalloys contain gamma prime as a strengthening agent, which is an intermetallic phase between aluminum and nickel with the approximate formula $Ni_3Al$ (often titanium is substituted in part for the aluminum). Many superalloys contain upwards of 5% aluminum and it would be desirable to produce interlayers with 5% (and greater) aluminum levels. Four percent is generally the upper limit for the production of homogeneous interlayers of complex alloys by rolling, and production is easier and more consistent if the aluminum level is limited to about two percent. Any deviation of the interlayer composition (except melting point depressant) from the alloys being joined can be equalized by extended diffusion heat treatments, but this is not desirable, particularly with the thicker interlayers. Also, aluminum raises the melting point of the interlayer to the point where the interlayer could not be used to join certain alloys. Thus, from both a technical and manufacturing standpoint, it would be desirable to be able to produce interlayers containing relatively high aluminum levels without the penalties of making the foil difficult to roll or raising the melting point excessively.

A similar problem is presented by a combination of carbon with carbide formers such as hafnium, chromium, tantalum, columbium, titanium, zirconium, tungsten, etc., which together with carbon may form brittle carbides. Current practice is to limit the percentage added of these elements in interlayers, but of course, bonds could more closely approximate the composition of the parent metal if greater amounts of these elements could be incorporated into the interlayer.

The basis of this invention is the production of an interlayer in lamellar form. Each of the lamellae or parts of the interlayer differ significantly in chemistry from the adjacent lamellae. Those lamellae provided in foil are free from those combinations of elements which cause brittle phases and other problems, thus the lamellar interlayer material is relatively ductile and may be fabricated by rolling. The overall composition of the interlayer (excluding the melting point depressant) is adjusted to be close to the composition of the materials being joined.

This concept may be employed in several different ways including the following:

A. Use of two or more separate foils, produced by rolling, with adjacent foils having distinct chemical compositions. These foils may be stacked in sandwich form to produce an interlayer of the desired thickness. Even though only two distinct compositions are required to produce the desired interlayer chemistry, it may be desirable to use several sets of the two foils to reduce diffusion distances and shorten the bonding cycle, the time required to produce a homogeneous bond, especially if a thick interlayer is desired.

B. Use of an interlayer is described in A above wherein the separate ductile foils have been bonded together, for example by co-rolling, to produce an integral lamellar interlayer material.

C. Use of one or more ductile rolled interlayers with a directly applied layer on at least one surface of the rolled interlayer. The layer would usually be metallic, but might contain nonmetallic elements such as boron. For example an electroless plating scheme could be used to apply a nickle boron alloy to the two surfaces of the interlayer, and the interlayer could be a (ductile) nickel-chromium-aluminum alloy. The same comments made above with reference to ductility of surface layers also apply to this embodiment.

In the above schemes boron would normally be used as the melting point depressant, although other depressants might be used. The boron could be applied by conventional boronizing; by vapor deposition, either pure boron or a boron metallic mixture; or by electroless plating, for example of a nickel boron alloy or niclel-cobalt-boron alloy. Other elements include aluminum which is desirable for precipitation strengthening and might be supplied in pure form, as part of a ductile alloy, or by various vapor deposition methods. Chromium is desirable since it lowers the melting point of some alloy interlayers, and because it increases the oxidation and corrosion resistance of the bond region; chromium might be applied as part of a ductile alloy or by plating or vapor deposition. Various refractory elements such as W and Mo, and carbide formers, such as Zr and Hf are desirable for high strength and creep resistance; these materials may also be applied as part of a ductile alloy or by plating and/or vapor deposition. In general these elements (except boron) would be desirable in substantially the same concentration as in the base alloy, and sufficient melting point additions would be used to depress the melting point as desired.

Another embodiment of the invention which should be discussed in an embodiment in which not all of the interlayer parts melt. For example the refractory metals such as tungsten are present in many superalloys and would be desirable in the interlayer but for the fact that they act to increase the interlayer melting point. It is desirable that bonding be performed at a low temperature so that minimal metallurgical changes occur in the articles being bonded. If a three part interlayer were utilized with the central alloy interlayer containing tungsten and the outer parts being fabricated from a Ni-15% Cr-3.5% B alloy (melting point 1930° F), the transient liquid phase bonding process could be performed at a temperature just slightly in excess of 1930° F. The tungsten free portions of the interlayer would melt at this temperature, and, although the tungsten containing layer would not melt it would be partially dissolved by the melted layers and permit satisfactory bonding. If however one unitary interlayer containing all of the tungsten was utilized, the process temperature required would be much greater.

Another similar embodiment involves the preparation of interlayers for wide gap bonding in which a lamellar interlayer is utilized to provide elements such as aluminum, titanium, carbon and the refractory metals within the bond area so that homogeneous bonds can be developed with only short diffusion times. For example, one of the interlayer components might have a composition close to that of the parent metal.

Although the invention has been shown and described with respect to a preferred embodiment thereof, it should be understood by those skilled in the art that various changes and omissions in the form and detail thereof may be made therein without departing from the spirit and the scope of the invention.

What is claimed is:

1. In an interlayer for bonding metallic articles which are based on a metal chosen from the group consisting of nickel, cobalt, and iron, said interlayer having a composition similar to that of the articles being joined, except for the addition of a quantity of at least one melting point depressant, said interlayer having a brittle characteristic because of the formation of brittle phases, the improvement which comprises:

providing the interlayer in the form of a plurality of lamellae, each of said lamellae being free from those combinations of elements which form brittle phases; whereby the lamellar interlayer is ductile even though its overall composition is one which would be brittle if produced in a homogeneous form.

2. An interlayer as in claim 1 wherein the melt depressant is boron.

3. An interlayer as in claim 1 wherein no single lamella contains amounts of the brittle gamma prime phase sufficient to impair fabricability.

4. An interlayer as in claim 1 wherein no single lamella contains significant amounts of both carbon and a material chosen from the group consisting of hafnium, chromium, tantalum, columbium, titanium, zirconium and tungsten and mixtures thereof.

5. An interlayer as in claim 1 wherein the lamellae are bonded together to form a unitary interlayer.

6. An interlayer as in claim 1 wherein at least one of the lamellae melts at a lower temperature than would a corresponding alloy of the overall composition of the lamellar interlayer.

* * * * *